Jan. 13, 1953        P. W. BROWN        2,624,911

APPARATUS FOR HOLDING POULTRY DURING SLAUGHTERING

Filed May 29, 1950

INVENTOR.
Paul W. Brown
BY
ATTORNEY.

Patented Jan. 13, 1953

2,624,911

UNITED STATES PATENT OFFICE 2,624,911

APPARATUS FOR HOLDING POULTRY DURING SLAUGHTERING

Paul W. Brown, Kansas City, Mo.

Application May 29, 1950, Serial No. 164,958

3 Claims. (Cl. 17—11)

This invention relates to the field of poultry processing equipment and particularly to apparatus used during the slaughter of poultry prior to removing the feathers therefrom.

The primary object of this invention is to provide a cabinet having specially-formed receptacles movably carried therein for holding poultry while being slaughtered and thereafter until the blood has drained from the carcass.

One of the important objects of this invention is to provide poultry slaughtering apparatus including a cabinet having a plurality of receptacles movably carried therein, an opening in the cover thereof through which the poultry may be lodged in the receptacles and a second opening in the side of the cabinet through which the head and neck of the fowl may be reached and the blood vessels cut as required, the cover of the cabinet being so disposed over the receptacles as to prevent the fowl from dislodgement by the violent motions that result from the killing process.

Minor objects of the invention will be made clear as the following specification progresses, reference being had to the accompanying drawing, wherein.

Figure 2:
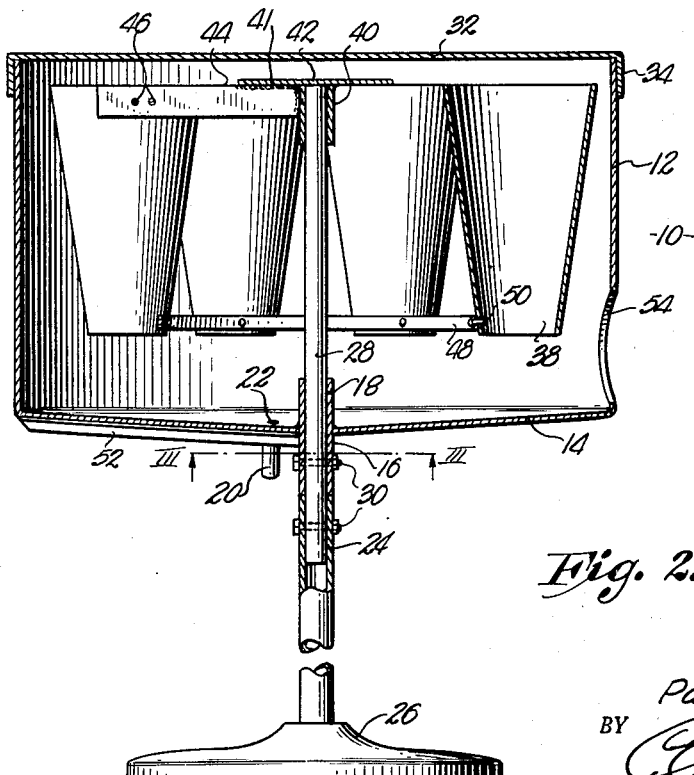
Fig. 2 is a cross sectional view taken on line II—II of Fig. 1.

The illustrated embodiment of the apparatus for holding poultry during the killing process has a hollow, open-top body generally designated by the numeral 10. Body 10 has a normally vertical, cylindrical, side wall 12 and a bottom wall 14. A sleeve 16 located at the axis of body 10 is integral with bottom wall 14, and a portion thereof extends above the bottom wall 14, as illustrated in Fig. 2.

A drain spout 20 depends from lower wall 14 and is in register with port 22 formed therein. Body 10 is supported by a hollow column 24 and a base 26. A post 28 extends through sleeve 16 and into column 24, and bolts 30 extend through sleeve 16, column 24 and post 28 to prevent relative movement of these respective elements. A cover 32 for the open top of body 10 has a downturned flange 34 extending around the periphery thereof and telescopes wall 12. A kidney-shaped opening 36 is formed in the cover 32 adjacent the margin edge thereof.

A plurality of frustoconical receptacles 38 having the larger ends thereof uppermost are mounted for movement within and about the axis of the body 10. A sleeve 40 rotatably carried by post 28 has a plate 42 joined to the uppermost end thereof for maintaining sleeve 40 at the uppermost end of post 28. A plurality of bars 44 are joined to sleeve 40 and plate 42, one of which is shown at 41 in Fig. 2, and extend laterally therefrom.

Receptacles 38 are affixed to bars 44 by rivets or analogous means 46 near the outermost ends of bars 44. An annulus 48 joined to the lowermost ends of receptacles 38 as at 50 prevent relative movement thereof and serves as a brace. A plurality of angle-iron stiffeners 52 extend radially from sleeve 16 along the under side of bottom wall 14 to the outermost edge thereof to strengthen the substantially flat bottom 14 of body 10. An aperture 54 is formed in wall 12 immediately above bottom 14.

During operation of the apparatus, the poultry to be killed is placed head down in the apparatus through opening 36 in the top 32. The head and neck of the fowl extend below the lowermost end of receptacle 38, and one bird is introduced into each receptacle 38. The aperture 54 in side wall 12 of body 10 allows the operator to reach into the cabinet, grasp the head of the fowl and sever the vein in the customary and well-known manner.

Figure 1:
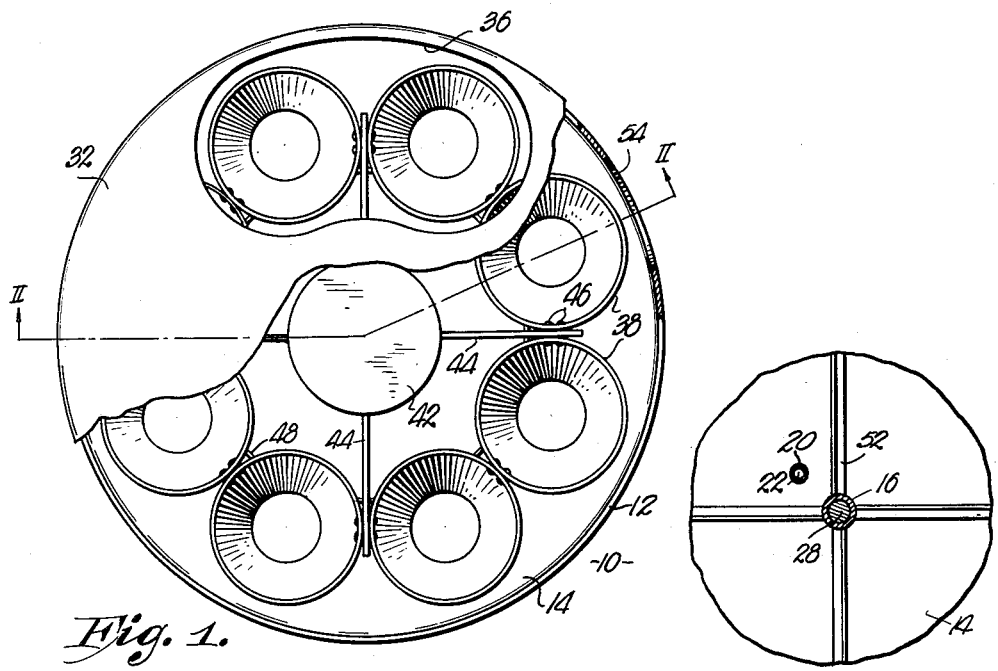
Fig. 1 is a fragmentary, top plan view of apparatus for holding poultry during slaughtering embodying my invention.
Figure 3:
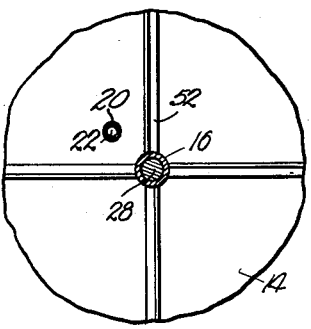
Fig. 3 is a fragmentary, cross sectional view taken along line III—III of Fig. 2, looking in the direction of the arrows.

In Fig. 1, aperture 54 is shown to the right of opening 36 in top 32. However, it may be desirable under some conditions to have aperture 54 off-set with respect to opening 36 in a manner different from that illustrated. Since top 32 is easily removable, such an adjustment may be made with little effort as required by the operating conditions. When killing large and strong fowls, it is desirable to have the uppermost end of receptacle 38 adjacent the top 32, whereby effectively trapping the fowl in the receptacle 38 before the killing process is begun. This obviates any possibility of the fowl's escaping from receptacle 38.

Live fowls are placed in the receptacles 38 through opening 36 and the receptacle assembly is rotated in step-by-step fashion; and, as each fowl passes aperture 54, the birds are independently slaughtered.

Manifestly, the poultry are held in an inverted position while passing from aperture 54 to opening 36, and the period of time required is sufficient to allow the drainage of blood from the carcass onto bottom 14 of body 10 and thence through drain 20. When the poultry is removed from the receptacles 38, they will be completely motionless and will have all the blood drained therefrom.

The easily removable top 32 has been provided for access to the interior of body 10 for cleaning. Further, the receptacle assembly may be lifted from post 28 for cleaning or repair as required.

The specific form and character of the parts forming the apparatus for holding poultry during slaughter may be different from those illustrated and described; and, therefore, it is desired to be limited only by the scope of the following claims.

Having thus described the invention, what I claim as new and desire to secure by Letters Patent is:

1. Apparatus for holding poultry during slaughtering, said apparatus comprising a hollow body having a bottom wall, a side wall, and a cover; a support mounted in the body for rotation on a vertical axis; and a plurality of frusto-conical, open end, receptacles carried by the support and arranged in a circular row about said vertical axis, the base ends of the receptacles being adjacent the cover, said cover having an opening therein disposed above the receptacles for communication therewith upon rotation of the support and receptacles, said side wall having an aperture formed therein adjacent the bottom wall and in alignment with the lowermost apex ends of the receptacles.

2. Apparatus as set forth in claim 1 wherein is provided a vertical post extending through said bottom wall; and means on the post beneath the bottom wall for supporting the body, said receptacle support being rotatably mounted on the uppermost end of the post.

3. Apparatus as set forth in claim 1 wherein is provided a vertical post extending through said bottom wall; and means on the post beneath the botom wall for supporting the body, said receptacle support being rotatably mounted on the uppermost end of the post, said cover being removable from said side wall, there being a sleeve on the receptacle support, surrounding the post and having a plate resting on the post for rendering the receptacle support and the receptacles removable from within the body.

PAUL W. BROWN.

REFERENCES CITED

The following references are of record in the file of this patent:

UNITED STATES PATENTS

| Number | Name | Date |
| --- | --- | --- |
| 1,310,931 | Schnitzen et al. | July 22, 1919 |
| 1,660,583 | Shrauger | Feb. 28, 1928 |
| 2,319,938 | Markins | May 25, 1943 |
| 2,490,761 | McDowell, Jr. | Dec. 6, 1949 |

FOREIGN PATENTS

| Number | Country | Date |
| --- | --- | --- |
| 700,434 | France | Dec. 23, 1930 |